US007721989B2

(12) United States Patent  (10) Patent No.: US 7,721,989 B2
Dyer et al.  (45) Date of Patent: May 25, 2010

(54) MULTI-PATH INLET FOR AIRCRAFT ENGINE

(75) Inventors: Richard S Dyer, Maryland Heights, MO (US); Thomas A Kaemming, Florissant, MO (US); Samuel E Horne, III, Creve Coeur, MO (US)

(73) Assignee: The Boeing Company, Chicago, IL (US)

( * ) Notice: Subject to any disclaimer, the term of this patent is extended or adjusted under 35 U.S.C. 154(b) by 319 days.

(21) Appl. No.: 11/365,900

(22) Filed: Mar. 1, 2006

(65) Prior Publication Data

US 2009/0114774 A1  May 7, 2009

(51) Int. Cl.
*B64D 33/02* (2006.01)
(52) U.S. Cl. .................................... 244/53 B
(58) Field of Classification Search ............... 244/53 B, 244/53 R; 137/15.1, 15.2; 55/306; 60/39.092
See application file for complete search history.

(56) References Cited

U.S. PATENT DOCUMENTS

| | | | | | |
|---|---|---|---|---|---|
| 2,553,512 | A | * | 5/1951 | Cotton, Jr. | 55/306 |
| 2,788,183 | A | | 4/1957 | Ferri | |
| 2,846,023 | A | * | 8/1958 | Millman | 55/306 |
| 2,944,631 | A | * | 7/1960 | Kerry et al. | 55/306 |
| 2,963,856 | A | * | 12/1960 | Caddell | 137/15.1 |
| 3,564,820 | A | * | 2/1971 | Nelson | 96/392 |
| 4,077,739 | A | * | 3/1978 | Heilenbach | 415/121.2 |
| 4,158,449 | A | * | 6/1979 | Sun et al. | 244/136 |
| 5,082,206 | A | | 1/1992 | Kutschenreuter, Jr. et al. | |
| 6,138,950 | A | * | 10/2000 | Wainfan et al. | 244/53 B |

OTHER PUBLICATIONS

Woollett, Richard R. and Ferguson, Harold M., "Performance of a Two-Dimensional Cascade Inlet At A Free-stream MACH Number of 3.05 and At Angles of Attack of -3°, 0°, 3°, And 6°," NACA Research Memorandum, dated Mar. 5, 1958.
"An Experimental Investigation of Two-Dimensional, Supersonic Cascade-type Inlets At A MACH Number of 3.11," National Advisory Committee for Aeronautics, Research Memorandum, RM L54E17.
(Classified) Rouse, R.W.; Walitt, L.; and Stroup, K.E. "1965 Advanced Ramjet Concepts Program Final Report, vol. I—Low Volume Ramjet Investigations, Part I—Components and Systems."

* cited by examiner

*Primary Examiner*—Tien Dinh
(74) *Attorney, Agent, or Firm*—Harness, Dickey & Pierce, P.L.C.

(57) ABSTRACT

An inlet for an aircraft, missile or other high speed airborne mobile platform, to receive intake air and compress the intake air for delivery to an engine of the mobile platform. The inlet has an array of inlet elements placed in side-by-side arrangement. Each inlet element has a passage for delivery of intake air. The array provides for compact volume and effective aerodynamic performance. The inlet may be mounted for rotation to start the inlet when at a supersonic speed. The inlet is shorter in length than traditional inlets and can be integrated into a wider variety of airframes, or at locations on existing airframes that would be difficult or impossible to integrate a traditional inlet on.

19 Claims, 7 Drawing Sheets

MULTI-PATH INLET FOR AIRCRAFT ENGINE

TECHNICAL FIELD

This disclosure relates generally to air intakes for airborne mobile platform engines, and in particular to an inlet formed of multiple inlet elements arranged into an array.

BACKGROUND

Modern high-speed airborne mobile platforms, for example jet aircraft, must meet performance requirements which call for an air induction system of substantial complexity. The inlet must provide intake air to the engine at a quantity and quality necessary to meet thrust requirements throughout the aircraft flight envelope. Accordingly, it must have a configuration which can efficiently receive and compress intake air at a variety of speeds and altitudes. Further, the inlet should have a compact volume so that it fits within tightly limited space constraints. The configuration of the inlet should facilitate uniformity in the flow of intake air and minimize adverse impacts to the aircraft. That is particularly difficult in an aircraft which has a complex aerodynamic shape. For example, some aircraft have edges and/or surfaces which are angled in two directions (i.e., swept back with respect to both the vertical and horizontal planes). Ideally, the inlet should conform to that contour and minimize generation of secondary flows and shock waves which produce flow non-uniformities.

Unfortunately, previous inlets fail to fully meet these needs. For example, some inlets have required a length for accomplishing compression of intake air which is excessive for the space available in the aircraft configuration. That necessitates a substantial re-design effort or, alternatively, a degradation of performance. Other inlets have configurations which sharply limit the potential location or size relative to the surrounding aircraft fuselage.

Another constraint on certain aircraft which operate at supersonic speed is the need to "start" the inlet. As known to those skilled in the art, an inlet having internal compression or mixed compression is designed to compress intake air moving at a supersonic speed within the interior of the inlet duct. The inlet must initially "swallow" a structure of shock waves when exceeding its starting Mach number in order to establish a stable condition where the inlet operates as intended. When the inlet is "unstarted," a phenomenon in which all shock waves remain outside of the inlet, the thrust produced by the engine is reduced substantially. A process for starting the inlet has typically required a variable geometry duct which provides a capability to increase flow passage size and receive a larger quantity of intake air, thereby swallowing the shock waves. Unfortunately, that capability requires additional complexity and weight.

SUMMARY

Generally, an inlet according to various embodiments of the present disclosure is for a high speed mobile platform to receive intake air and compress the intake air for delivery to an engine. In one example the inlet is used with a high speed jet aircraft. The inlet comprises a plurality of inlet elements placed in side-by-side arrangement defining an array. Each inlet element has a passage for delivery of intake air. The array includes two or more of the inlet elements forming a row and two or more inlet elements forming a column. Each inlet element has a forward end, a rearward end, and a flow area along the passage which is non-uniform between the forward end and the rearward end for compressing intake air as it flows therethrough.

In another aspect, an air induction system according to the disclosure is for a high speed mobile platform, for example an aircraft, to receive an adjustable quantity of engine intake air. The system comprises an inlet having at least one passage for receiving a flow of intake air. The inlet has a front face for facing generally in a forward direction and defining a frontal area. A mount is for connecting the inlet to the aircraft at an adjustable position. The inlet is selectively moveable between a first position wherein the front face has a frontal area which is relatively larger and a second position wherein the front face has a frontal area which is relatively smaller, such that the inlet at its second position is capable of receiving a smaller quantity of intake air than when the inlet is at its first position.

In still a further aspect of the disclosure, a method of starting an air induction system of a high speed mobile platform, such as an aircraft, is for operation at a supersonic speed. The method comprises the steps of connecting an inlet to the aircraft with a mount which permits controllable movement of the inlet relative to the aircraft. The inlet has a front face for facing generally in a forward direction and defining a frontal area, wherein movement of the inlet changes the frontal area of the inlet. The aircraft is accelerated to a supersonic speed. The inlet is placed at a position having a frontal area which is relatively smaller such that the inlet is capable of receiving a smaller quantity of intake air. The inlet is moved to a different position having a frontal area which is relatively larger such that the inlet is capable of receiving a larger quantity of air. The aircraft is operated with the inlet at said different position.

Other features of the present disclosure will be in part apparent and in part pointed out hereinafter.

BRIEF DESCRIPTION OF THE DRAWINGS

The present disclosure will become more fully understood from the detailed description and the accompanying drawings, wherein.

Corresponding reference characters indicate corresponding parts throughout the views of the drawings.

DETAILED DESCRIPTION

Figure 1:
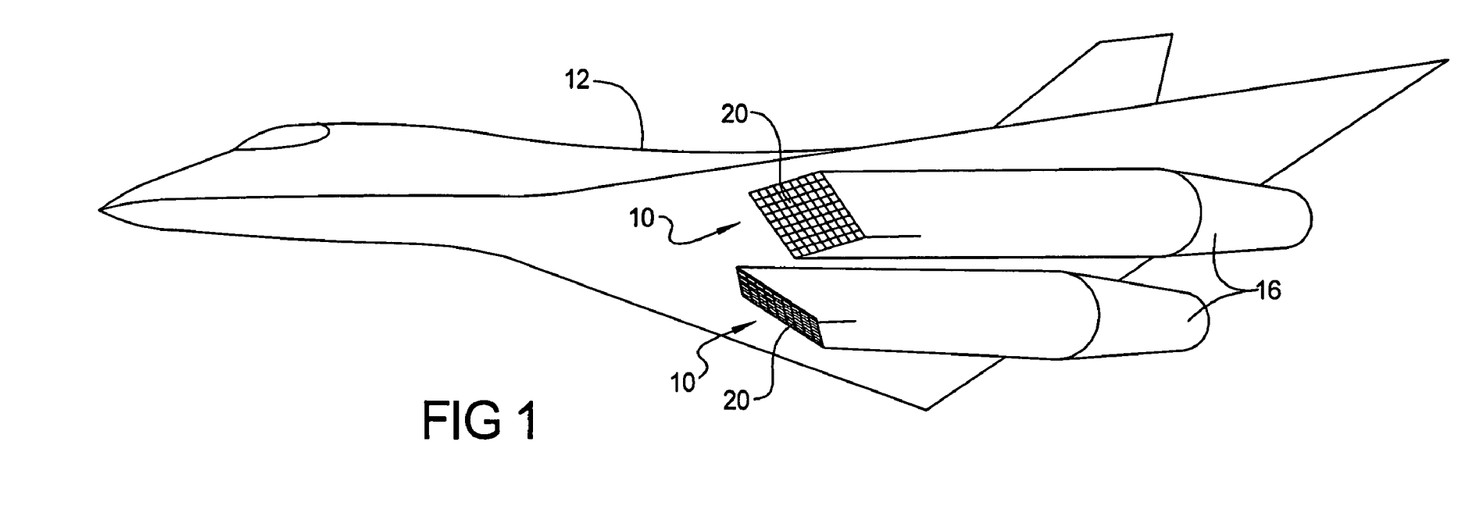
FIG. 1 is a perspective view of an aircraft incorporating an array inlet in accordance with one embodiment of the present disclosure.

Referring now to the drawings and in particular to FIG. 1, an air induction system according to an embodiment of the present disclosure is indicated generally at 10. There are two air induction systems 10 positioned on a mobile platform, in this example an aircraft 12, forward of corresponding engines 16. Each system 10 provides intake air to the corresponding engine 16 at a quantity and quality necessary to meet thrust requirements throughout the aircraft flight envelope. Although the aircraft 12 shown in FIG. 1 is a supersonic manned vehicle, it is understood that the system 10 may be used at any speed regime and with any form of mobile platform or machine capable of atmospheric flight, including without limitation missiles and manned or unmanned aircraft.

Figure 2:
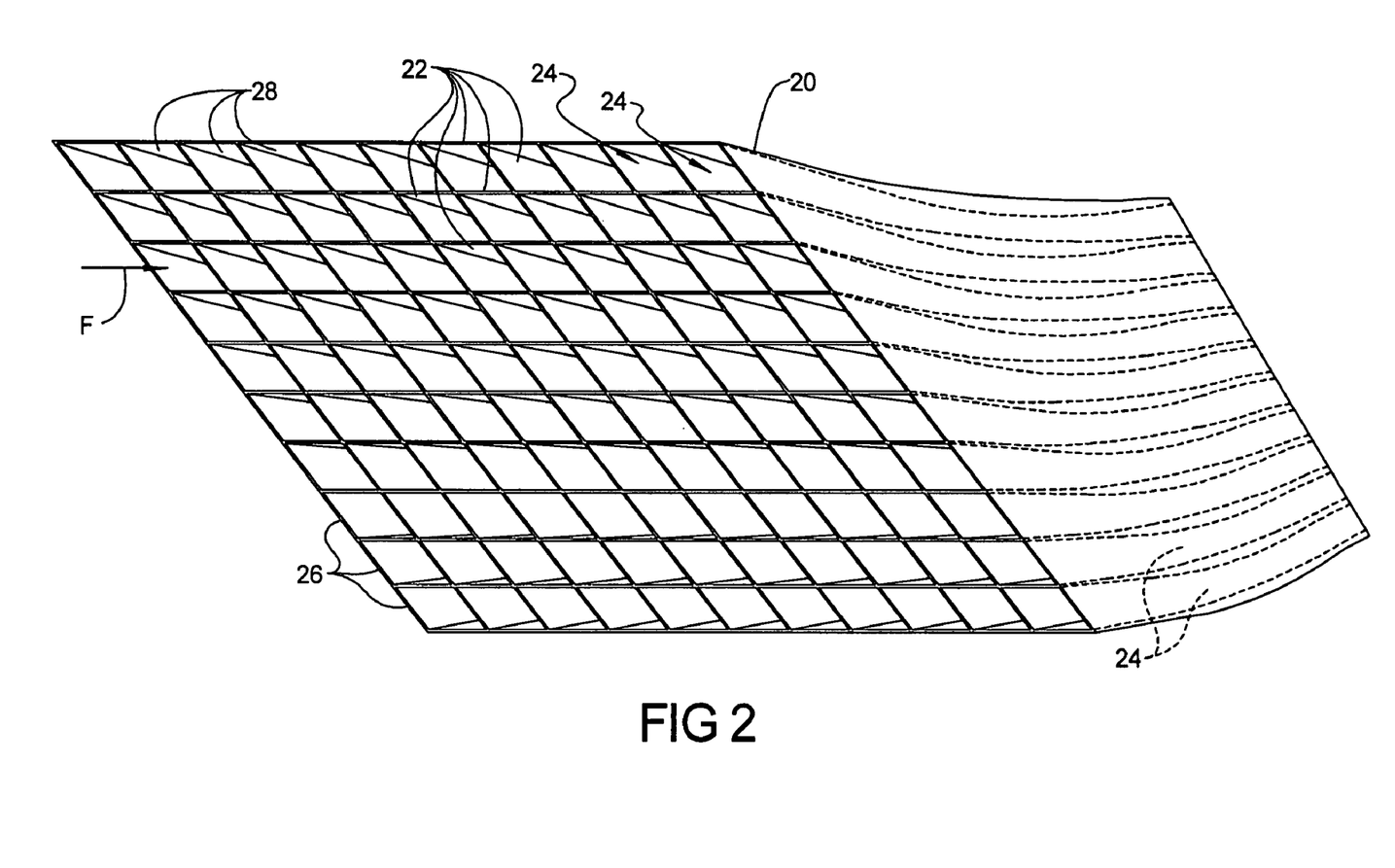
FIG. 2 is a side elevational view of the array inlet

The air induction system 10 includes an array inlet 20 which is received in a cavity of the airframe structure and is configured to compress the intake air for delivery to the engine. As shown in FIG. 2, the inlet 20 includes a plurality of inlet elements 22 placed in an arrangement defining an array. Each inlet element 22 has a passage 24 for delivery of intake air toward the engine. In one embodiment, all of the inlet elements 22 are placed directly adjacent in side-by-side, contiguous arrangement. That facilitates desirable aerodynamic performance by avoiding any regions of stagnant flow which could occur between inlet elements, as well as minimizes volume. However, it is understood that the inlet elements may be placed in a non-contiguous arrangement (along the entire or partial length) without departing from the scope of this disclosure.

Figure 3:
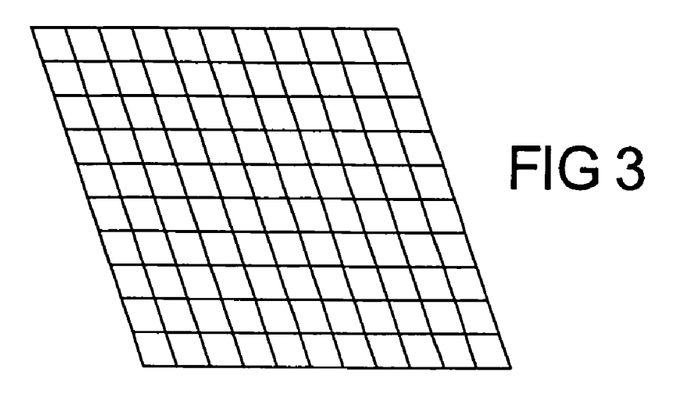
FIG. 3 is a front elevational view of the array inlet of FIG. 1.
Figure 4:
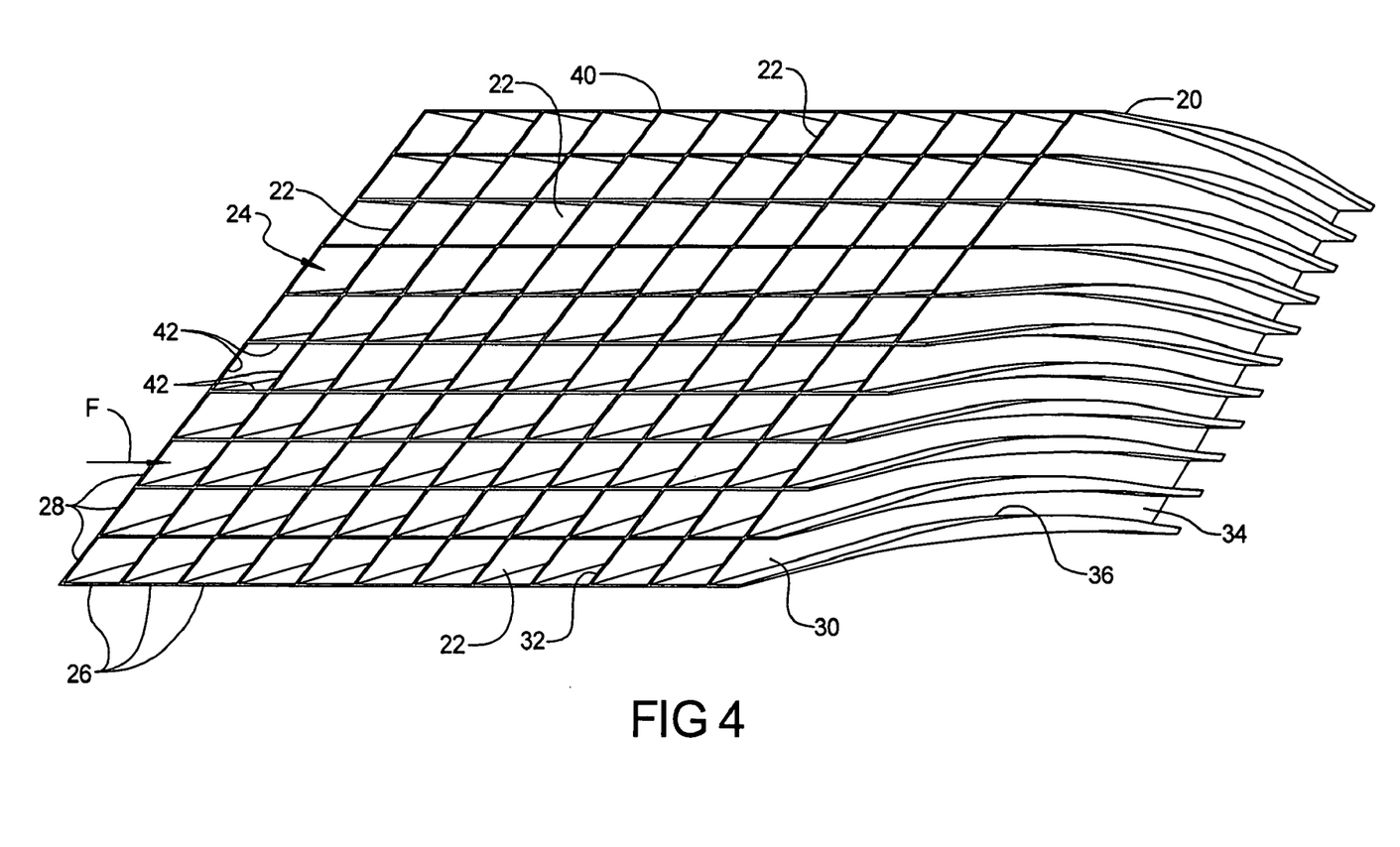
FIG. 4 is a lower perspective view of the array inlet of FIG. 1 with a sidewall portion of the array inlet removed to show the construction of the flowpaths of several of the inlet elements.

The inlet elements 22 are arranged so that the array 20 is two-dimensional, that is, it forms a row 26 of inlet elements 22 in a first direction and a column 28 of inlet elements in a second direction which is non-collinear with the first direction. In the embodiment shown in FIGS. 2, 3, and 4, there are ten rows and eleven columns of inlet elements 22. However, any number of two or more inlet elements may define a row or column. Further, a row or column may be a non-linear or non-uniform assembly of irregularly shaped inlet elements.

An advantage of the array inlet 20 is that a designer may increase or decrease the number of inlet elements 22 (and corresponding size of the inlet) as is needed for a particular engine or speed/altitude sizing condition without degrading aerodynamic performance. Unlike an inlet which is a single cavity or a one-dimensional stack of elements, the array inlet 20 may be scaled to any size or shape without adding structural supports within the flowpath and without altering the geometry of each element 22. Thus, it avoids losses from a wide flowpath (i.e., large width-to-height aspect ratio) or from shock waves and boundary layer interaction which would arise with conventional sidewalls. During design studies, the designer has the flexibility to place the inlet 20 at a greater variety of locations on the aircraft while maintaining effective aerodynamic performance. Consequently, an improved optimum location and size may be determined.

Figure 5:
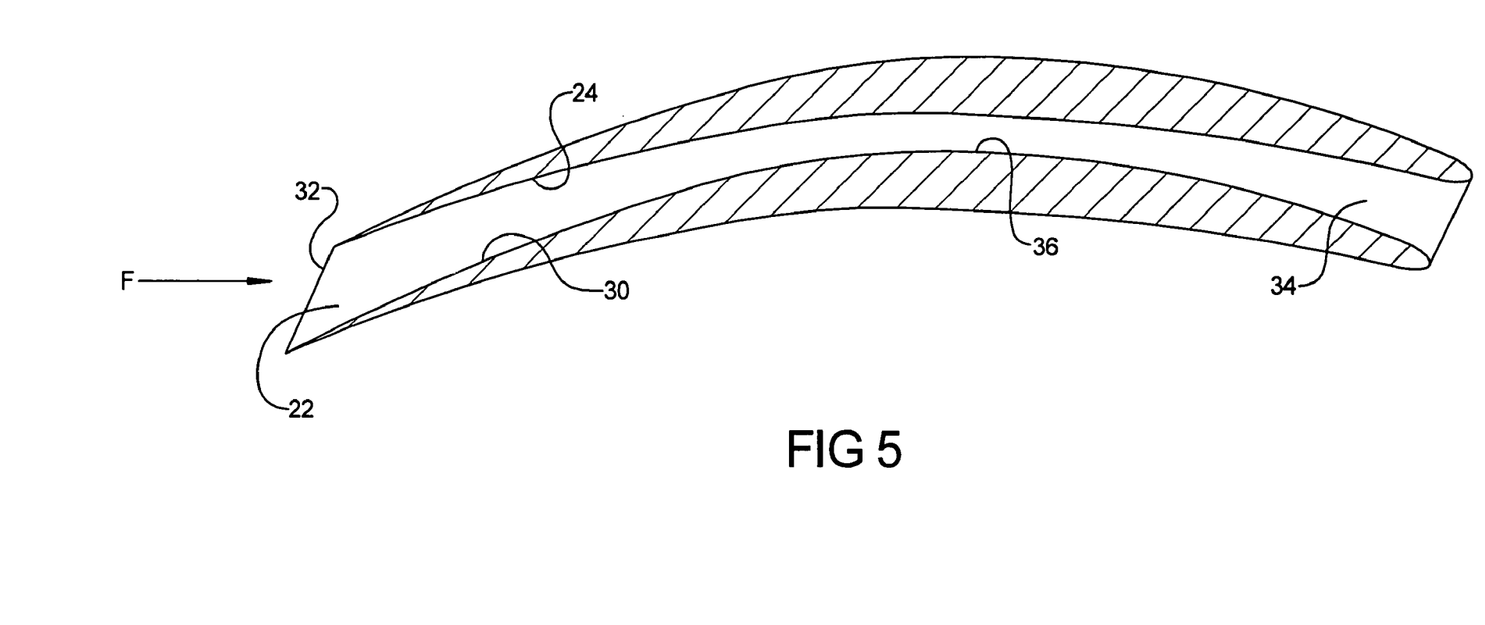
FIG. 5 is a typical cross-sectional side view of the flowpath for one inlet element.

Referring to FIG. 5, each inlet element 22 has a forward end 30 which terminates at a front edge 32. In the embodiment shown in the drawings, the front edges 32 of adjacent inlet elements are coterminous (i.e., they have a common front edge). This provides for smooth aerodynamic flow and improved pressure recovery. Each inlet element 22 extends from the forward end 30 to a rearward end 34 and has a non-uniform flow area along the passage configured to compress intake air. Thus, unlike a screen or filter which merely passes flow, the array inlet 22 is configured to increase pressure as a prelude to combustion. The passage 24 converges to a minimum area region 36 (FIG. 5) which is positioned between the forward end 30 and rearward end 34. As known to those skilled in the art, intake air received within the inlet at a supersonic speed is typically slowed to near sonic velocity (Mach 1.0) at the minimum area region 36. The passages 24 of all inlet elements 22 are generally parallel to minimize volume. In the embodiment shown in the drawings, the inlet elements are substantially identical. However, it is understood that the passages may be non-parallel and/or substantially different without departing from the scope of this disclosure. In another embodiment (not shown), those inlet elements which are positioned along an outer periphery of the array (i.e., the outermost row or column) function as boundary layer diverters to eliminate air at low speed and/or lower pressure and thereby prevent its delivery to the engine.

The array inlet 20 is adapted to have a compact volume so that it fits within tightly limited space constraints. As known to those skilled in this art, a supersonic inlet typically requires a length which is significantly longer (e.g., 6 to 12 times) than its effective exit diameter in order to achieve adequate compression of intake air. The multiple, smaller inlet elements 22 of the present disclosure provide an effective diameter which is smaller than that of a single duct inlet. Accordingly, the length of the array inlet 20 is correspondingly smaller (e.g., one-tenth) to achieve an equal length-to-diameter ratio and an equal compression. Because it is relatively short, compared to the length of a conventional inlet, the inlet 20 may be integrated at a greater variety of locations on the aircraft. In some instances, the significantly shorter overall length of the array inlet 20 may enable its integration on a mobile platform at a location that would be impossible for a conventional inlet to be integrated at.

The forward ends 30 of said plurality of inlet elements collectively define a front face 40 of the inlet. In one embodiment, the front face 40 is generally planar. The front face 40 of the inlet may be oriented at an oblique angle with respect to the forward direction of the aircraft 12 and at an oblique angle with respect to the vertical direction. When the aircraft is in level flight, the front face 40 is angled in two directions from the orientation of approaching intake air.

As shown in FIG. 2, the rows and columns of the array are arranged at the front face 40 in an orthogonal and generally perpendicular relation. However, the array may be constructed with any angular relation between rows and columns (i.e., any non-collinear arrangement), or with non-straight rows or columns. For certain mobile platforms, for example an aircraft (not shown), the front face may be integrated on the aircraft fuselage in a blended manner such that the front face meets and substantially conforms to a contour of the aircraft directly adjacent to the front face.

Each passage 24 of every inlet element 22 is configured to effectively compress the intake air flowing into it. The front face 40 and leading portion of each passage is constructed to be a "waverider." As known to those skilled in the art, the inlet is shaped such that it will generate a planar shock wave in the plane of the front face 40. That leads to a generally uniform pressure distribution and good pressure recovery as the intake air enters each inlet passage 24, as it eliminates interaction between transverse shock waves and the boundary layer. Accordingly, the front face 40 is swept rearwardly with respect to the direction of flow. The passage 24 of each inlet element has, in one embodiment, four side walls 42. Preferably, the side walls 42 have a "caret" shape which is an effective waverider. As known to those skilled in the art, a caret shaped surface is the surface of an isosceles triangle which has been folded along its base altitude line to form two mirror-image right triangles which meet along the altitude line. The advantages are minimization of pressure losses, and that the side wall surfaces of the passage function as both compression surfaces and wall boundaries.

The passage 24 of each inlet element 22 can be contoured to turn the flow and provide a desired direction of efflux of the compressed air. For example, the flow may be vectored for purposes of better alignment with the engine or to facilitate a better external aircraft contour (e.g., for lower drag) adjacent to the inlet. As shown in the embodiment of FIG. 5, the passage turns so that air exits the passage at a different flow direction than upon entering. The passage has a first turn relative to the direction of incoming air (indicated by arrow F) followed by a second turn opposite the first turn. The upwash or downwash of the flow is therefore changed by the passage. However, it is understood that the passage may be straight, providing no change in flow direction, without departing from the scope of this disclosure.

In the embodiment shown in the drawings, the inlet 20 has a one-piece construction. That provides for low cost, weight, and complexity. However, the inlet could, if necessary, be formed of multiple parts which are fastened together. The inlet 20 is made of a high-strength, low-weight material, with an exemplary material being titanium. It may be fabricated by a suitable process such as investment casting.

Figure 9:
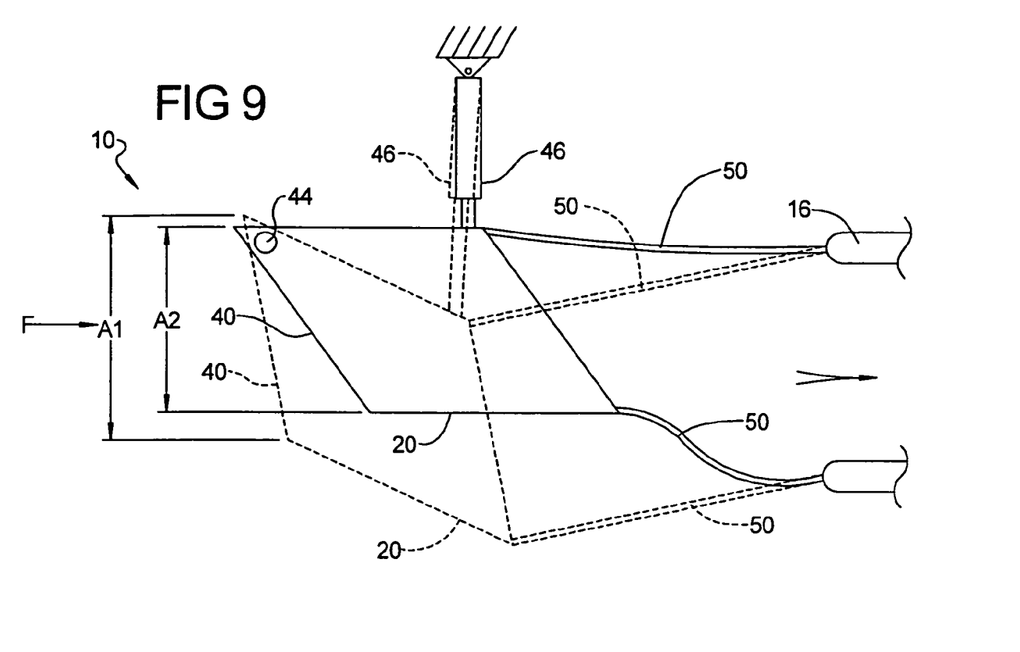
FIG. 9 is a schematic side elevational view of the air induction system at a first position shown in dashed lines and at a second position shown in solid lines.
Figure 10:
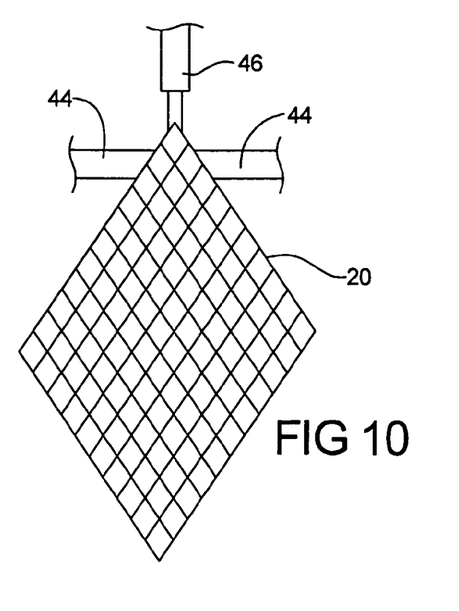
FIG. 10 is a schematic front elevational view of the array inlet and its connection to the aircraft.

Referring to FIGS. 9 and 10, the inlet in one embodiment is connected to the aircraft 12 such that it is controllably movable. The inlet 20 can be moved between a first position (shown in dashed lines on FIG. 9) wherein the front face 40 has a frontal area A1 which is relatively larger and a second position (shown solid on FIG. 9) wherein the front face has a frontal area A2 which is relatively smaller. Consequently, the inlet 20, at its first position, is capable of receiving a larger quantity of intake air than when the inlet is at its second position. As known to those skilled in the art, the inlet 20 at the second position has a smaller "capture ratio" (ratio of frontal area to minimum flow area) such that, when at supersonic speed, the shock waves in front of the inlet may be swallowed into the inlet. Further, when the inlet 20 is at its second position, the forward ends of the passages may be better aligned with the direction of flow of intake air to further aid the swallowing of the shock waves. It is understood that the inlet 20 may be at a fixed position relative to the aircraft without departing from the scope of this disclosure.

The air induction system 10 includes a support 44 (broadly, a "mount") which connects the inlet 20 to the nearby structure of the aircraft. In one embodiment, the mount 44 comprises a pivot configured such that the inlet 20 is moveable relative to the aircraft by rotation about said pivot. Rotating the inlet 20 changes the orientation of the front face 40 to an angle which is either more or less nearly perpendicular to the incoming flow F of intake air. It is understood that the inlet 20 can have various types of mounts and may be moveable by translation to change position, or by a combination of translation and rotation, without departing from the scope of this disclosure. An actuator 46 engages the inlet 20 for controllably moving the inlet between the first and second positions. The air induction system 10 also includes a flexible conduit or seal 50 positioned rearward of the inlet 20 for receiving the compressed air which exits the inlet and delivering it to the engine 16. Because the entire inlet 20 is moveable, it reduces mechanical complexities which accompany a variable geometry duct for changing minimum area to start an inlet.

A method of starting the inlet 20 for operation at a supersonic speed requires initially operating the aircraft, the mobile platform or, for example an inlet at the first position which has a relatively larger frontal area A1. When the aircraft 12 has accelerated to a supersonic speed, a pilot or an automated controller energizes the actuator 46 so that the inlet 20 moves to the second position having a relatively smaller frontal area A2. The seal 50 flexes with movement of the inlet 20 so that there is no leakage of intake air. The inlet 20 remains at the second position until such time as the shocks are swallowed. As known to those skilled in the art, that occurs typically in less than one second. Then the inlet 20 may be moved to a third position (not shown) which has a frontal area larger than A2, for continued operation at supersonic speeds with stable operation and good pressure recovery. The third position is similar to the first position but can vary with speed and altitude, such that the third position can have a frontal area which is greater than, less than, or about the same as the first position A1. But it will always be greater than A2. The sequence for starting is thus to move the inlet such that, in relative size, the frontal area is initially larger, then smaller, then larger again.

Figure 6:
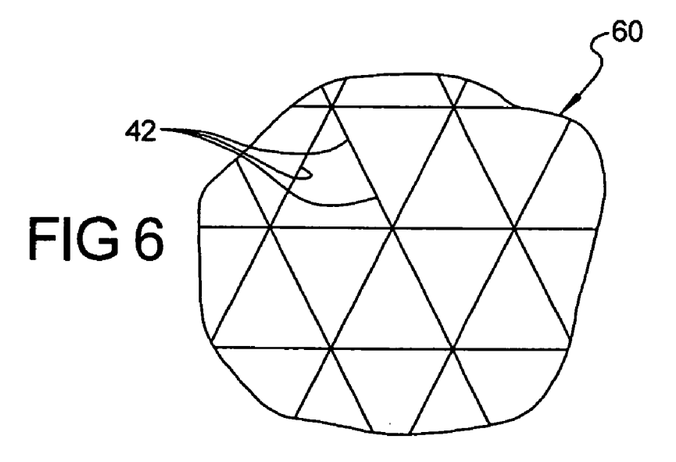
FIG. 6 is an enlarged fragmentary front view of an array inlet of a second embodiment.
Figure 7:
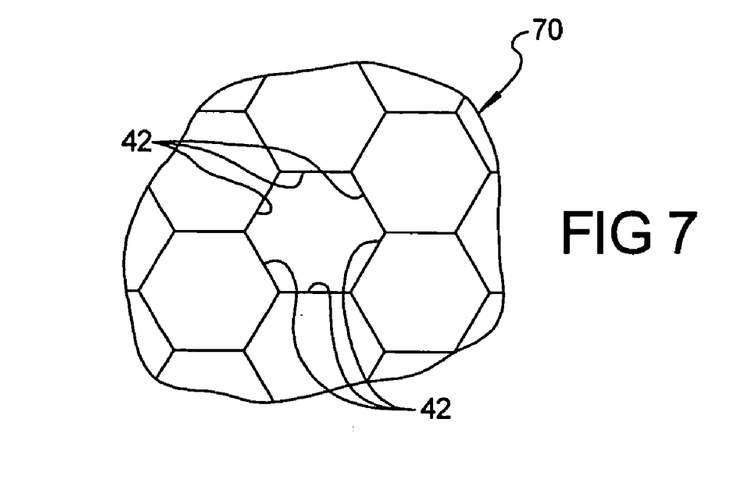
FIG. 7 is an enlarged fragmentary front view of an array inlet of a third embodiment.
Figure 8:
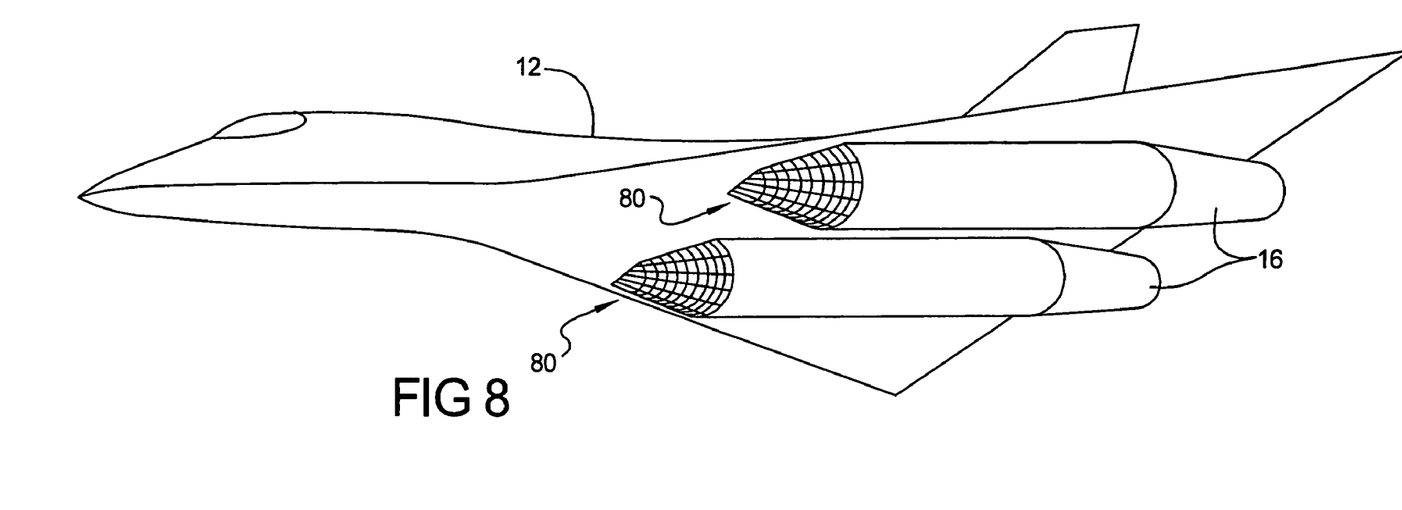
FIG. 8 is a perspective view of an aircraft incorporating an array inlet of a fourth embodiment.

Referring to FIG. 6, a second embodiment 60 of the array inlet is shown which has passages with three walls 42. The triangular shapes fit in a compact arrangement. A third embodiment 70 (FIG. 7) of the array inlet has hexagonal inlet element passages with six walls 42. These embodiments can provide advantages in manufacturing and strength for particular aircraft integrations. A fourth embodiment 80 is shown in FIG. 8, wherein the front face of the inlet is generally conical, producing a conical initial shock wave system rather than a planar one. In another embodiment (not shown), there is no seal 50 such that air is allowed to leak when the inlet is at the second position.

In view of the above, it will be seen that a number of significant benefits and advantages are achieved with the various exemplary embodiments disclosed herein. When introducing elements of the present disclosure or the described embodiment(s), the articles "a", "an", "the" and "said" are intended to mean that there are one or more of the elements. The terms "comprising", "including" and "having" are intended to be inclusive and mean that there may be additional elements other than the listed elements.

As various changes could be made in the above without departing from the scope of the disclosure, it is intended that all matter contained in the above description and shown in the accompanying drawings shall be interpreted as illustrative and not in a limiting sense.

What is claimed is:

1. An inlet for an supersonic airborne mobile platform to receive intake air at a supersonic speed and to compress the intake air for delivery to an engine of the mobile platform while the mobile platform is travelling at a supersonic speed, the inlet comprising:
   a plurality of inlet elements placed in side-by-side arrangement defining an array, each said inlet element having a passage for delivery of intake air at a supersonic speed, said array including two or more of said inlet elements forming a row and two or more of said inlet elements forming a column;
   each said inlet element having a forward end, a rearward end, and a flow area along the passage which is non-uniform between the forward end and the rearward end, and which forms a reduced area region at an intermediate point between its forward and rearward ends for compressing said intake air as it flows therethrough.

2. The inlet as set forth in claim 1, wherein all of the inlet elements of the array are placed in a contiguous arrangement.

3. The inlet as set forth in claim 2, wherein the forward end of each said inlet element has an edge which is coterminous with an adjacent one of said inlet elements.

4. The inlet as set forth in claim 2, wherein the passages of all of said inlet elements in said array are generally parallel.

5. The inlet as set forth in claim 4, wherein all the passages of said plurality of inlet elements are substantially identical.

6. The inlet as set forth in claim 5, wherein said row and said column of the array are arranged in a generally perpendicular relation.

7. The inlet as set forth in claim 1, wherein said row extends in a first direction and said column extends in a second direction which is non-collinear with said first direction.

8. The inlet as set forth in claim 1, wherein the forward ends of said plurality of inlet elements collectively define a front face of the inlet, and wherein said front face is generally planar.

9. The inlet as set forth in claim 1, wherein the forward ends of said plurality of inlet elements collectively define a front face of the inlet, and wherein said front face is generally conical.

10. The inlet as set forth in claim 1, wherein the reduced area region is formed at an intermediate point along the length of the passage.

11. The inlet as set forth in claim 1, wherein the passage of each said inlet element includes side walls which have a caret shape.

12. The inlet as set forth in claim 1, wherein the passage of each said inlet element has exactly four side walls.

13. The inlet as set forth in claim 1, wherein the passage of each said inlet element has exactly three side walls.

14. The inlet as set forth in claim 1, wherein the passage of each said inlet element has exactly six side walls.

15. The inlet as set forth in claim 1, wherein the inlet has a one-piece construction.

16. The inlet as set forth in claim 1, in combination with said mobile platform.

17. The inlet as set forth in claim 16, wherein the inlet is pivotally moveable relative to the mobile platform.

18. The inlet as set forth in claim 16, wherein the mobile platform has a forward directional axis and a vertical axis, the forward ends of said plurality of inlet elements collectively define a front face of the inlet which is generally planar, and wherein the front face of the inlet is oriented at an oblique angle with respect to the forward direction and at an oblique angle with respect to the vertical direction.

19. An inlet for an supersonic airborne mobile platform to receive intake air at a supersonic speed and to compress the intake air for delivery to an engine of the mobile platform while the mobile platform is travelling at a supersonic speed, the inlet comprising:

a plurality of inlet elements placed in side-by-side arrangement defining an integral array, each said inlet element having a passage for delivery of intake air at a supersonic speed, said array including two or more of said inlet elements forming a row and two or more of said inlet elements forming a column;

each said inlet element having a forward end, a rearward end, and a curving, cross sectional flow area along the passage which is non-uniform in area between the forward end and the rearward end.

* * * * *